US 7,610,904 B2

(12) United States Patent
Treier et al.

(10) Patent No.: US 7,610,904 B2
(45) Date of Patent: Nov. 3, 2009

(54) HYDROCARBON ADSORBER FOR AIR INDUCTION SYSTEMS

(75) Inventors: Philip P. Treier, Bloomdale, OH (US); Michael L. Herald, Maumee, OH (US); Christopher P. Montelauro, Bowling Green, OH (US)

(73) Assignee: Honeywell International Inc., Morristown, NJ (US)

( * ) Notice: Subject to any disclaimer, the term of this patent is extended or adjusted under 35 U.S.C. 154(b) by 33 days.

(21) Appl. No.: 11/766,513

(22) Filed: Jun. 21, 2007

(65) Prior Publication Data

US 2008/0000455 A1    Jan. 3, 2008

Related U.S. Application Data

(60) Provisional application No. 60/815,709, filed on Jun. 22, 2006.

(51) Int. Cl.
*F02M 37/20* (2006.01)
*F02M 33/02* (2006.01)
*B01D 53/02* (2006.01)

(52) U.S. Cl. .......................... 123/516; 123/518; 96/121; 96/135

(58) Field of Classification Search ................. 123/516, 123/518, 519; 96/108, 134, 143, 154, 121
See application file for complete search history.

(56) References Cited

U.S. PATENT DOCUMENTS

| 5,484,466 | A | * | 1/1996 | Brown et al. | 55/498 |
|---|---|---|---|---|---|
| 6,152,996 | A | * | 11/2000 | Linnersten et al. | 96/135 |
| 6,440,200 | B1 | * | 8/2002 | Sakakibara et al. | 96/134 |
| 6,758,885 | B2 | * | 7/2004 | Leffel et al. | 96/134 |
| 6,835,234 | B2 | * | 12/2004 | Leffel et al. | 96/108 |
| 6,905,536 | B2 | * | 6/2005 | Wright | 96/134 |
| 6,997,977 | B2 | * | 2/2006 | Dallas et al. | 96/153 |
| 7,163,574 | B2 | | 1/2007 | Bause et al. | |
| 7,168,417 | B2 | * | 1/2007 | Arruda et al. | 123/518 |
| 7,213,581 | B2 | * | 5/2007 | Burke et al. | 123/516 |
| 7,222,612 | B2 | * | 5/2007 | Hagler et al. | 123/516 |
| 7,276,098 | B2 | * | 10/2007 | Koslow | 55/385.3 |
| 7,278,406 | B2 | * | 10/2007 | Hagler | 123/516 |
| 7,344,586 | B2 | | 3/2008 | Zulauf et al. | |
| 7,377,966 | B2 | | 5/2008 | Smith et al. | |
| 2002/0029693 | A1 | * | 3/2002 | Sakakibara et al. | 96/134 |
| 2002/0059920 | A1 | * | 5/2002 | Yoshioka et al. | 123/518 |
| 2002/0179065 | A1 | | 12/2002 | Everingham et al. | |

(Continued)

OTHER PUBLICATIONS

International Search Report for PCT/US2007/071774 dated Feb. 20, 2008.

(Continued)

*Primary Examiner*—Thomas N Moulis
(74) *Attorney, Agent, or Firm*—Cantor Colburn LLP

(57) ABSTRACT

An inlet conduit for an engine air induction system, comprising: a plurality of openings located about the inlet conduit; a hydrocarbon vapor-adsorbent member disposed on an exterior surface of the inlet conduit, the hydrocarbon vapor-adsorbent member covering the plurality of openings; and a covering member secured over the hydrocarbon vapor-adsorbent member, the covering member sealing the hydrocarbon vapor-adsorbent member to the inlet conduit, wherein hydrocarbon vapors present in the air induction system after engine shut-down are substantially retained in the hydrocarbon vapor-adsorbent member until air flows through the air induction system after the engine starts.

20 Claims, 4 Drawing Sheets

U.S. PATENT DOCUMENTS

| | | | |
|---|---|---|---|
| 2003/0066427 A1* | 4/2003 | Ishida | 96/135 |
| 2003/0182911 A1* | 10/2003 | Schrage | 55/498 |
| 2003/0192512 A1* | 10/2003 | Luley et al. | 123/519 |
| 2004/0182240 A1 | 9/2004 | Bause et al. | |
| 2005/0223894 A1* | 10/2005 | Sohnemann | 95/143 |
| 2006/0096458 A1* | 5/2006 | Abdolhosseini et al. | 96/134 |
| 2006/0150811 A1* | 7/2006 | Callahan et al. | 95/146 |
| 2006/0266220 A1* | 11/2006 | Weber et al. | 96/134 |

OTHER PUBLICATIONS

International Written Opinon for PCT/US2007/071774 dated Feb. 20, 2008.

* cited by examiner

HYDROCARBON ADSORBER FOR AIR INDUCTION SYSTEMS

CROSS REFERENCE TO RELATED APPLICATIONS

This application claims the benefit of U.S. Provisional Patent Application Ser. No. 60/815,709, filed Jun. 22, 2006 the contents of which are incorporated herein by reference thereto.

This application is also related to U.S. patent application Ser. No. 10/978,923, filed Nov. 1, 2004; Ser. No. 10/927,383, filed Aug. 26, 2004; Ser. No. 10/806,942, filed Mar. 23, 2004; and Ser. No. 10/392,044, filed Mar. 19, 2003 the contents each of which are incorporated herein by reference thereto.

BACKGROUND

The present disclosure relates generally to adsorptive members and/or adsorptive filters, and more particularly to filters useful for adsorbing hydrocarbon vapors.

In internal combustion engines, while the engine is running, there is a constant flow of air through the air induction system into the intake manifold and finally into the combustion chamber through the intake valves. The airflow is caused by the intake stroke of the piston, which draws a vacuum on the intake manifold. This creates an imbalance of pressures between the intake manifold and the environment, and thus air rushes in through the air induction system. Due to the low internal pressure in the intake manifold and the constant airflow into the engine during engine operation, there are no evaporative emissions out through the inlet opening of the intake manifold or air induction system.

In addition, and when a fuel injected engine is running, a fuel system maintains the fuel in the fuel rail(s) at sufficient pressure to prevent the vaporization of the fuel even though the fuel rail(s) may be at a temperature sufficient to vaporize the fuel at normal atmospheric pressure. In fact, good restarting in part may depend on maintaining fuel rail pressure for a number of hours after shut down until the engine cools to prevent fuel vaporization in the fuel rail(s). Fuel vapor in the fuel rail(s) is generally undesirable in that it may lead to long crank times during engine start up.

After engine shut-down, air continues to rush through the air induction system until the intake manifold vacuum is eliminated. Evaporative hydrocarbons may be emitted if the pressurized fuel in the fuel rail(s) leaks into the intake manifold through the fuel injectors or un-combusted fuel in the system is present. This small amount of fuel may vaporize, and the hydrocarbon vapor may migrate out of the intake manifold through the inlet opening of the air induction system into the atmosphere. In the past, such hydrocarbon vapor egress was considered negligible. However, current regulations and environmental awareness have created the need to provide internal combustion engines wherein evaporative emissions from the air induction system are virtually zero.

Attempts to solve the problem of evaporative hydrocarbon emissions have included placing secondary, hydrocarbon adsorbing filters directly or across the direct air flow path. However, by disposing an extra layer of filtration media across this flow path causes an additional flow restriction to be placed upon the air induction system. As such, the engine is generally less efficient, or the air induction system may need to be sized larger in order to provide the same mass airflow with the increased restriction.

Other attempts have included combining hydrocarbon vapor-adsorbing materials with a standard particulate/contaminant air filter. Some drawbacks associated with these combination filters include the possibility of vapor-adsorbing material flaking out of the filter and entering the air system. The loss of adsorbent material may deleteriously affect the vapor absorbance of the filter.

Accordingly, it is desirable to provide a filter, apparatus and method of manufacture wherein the hydrocarbon absorber is capable of providing the desired hydrocarbon emission reduction without adversely affecting the performance of the air induction system.

SUMMARY OF THE INVENTION

An evaporative emissions filter for an engine air induction system having an air filter housing and an air inlet flow path is disclosed. The evaporative emissions filter includes a hydrocarbon vapor-adsorbent member disposed within the air induction system, wherein the vapor-adsorbent member includes a structural body configured to support the hydrocarbon adsorbing materials.

Other exemplary embodiments further include means for mounting the evaporative emissions filter within the air induction system, wherein hydrocarbon vapors present in the air induction system after engine shut-down are substantially retained in the adsorbent member until air flows through the air induction system after the engine starts.

In another exemplary embodiment an inlet conduit for an engine air induction system is provided, the inlet conduit comprising: a plurality of openings located about the inlet conduit; a hydrocarbon vapor-adsorbent member disposed on an exterior surface of the inlet conduit, the hydrocarbon vapor-adsorbent member covering the plurality of openings; and a covering member secured over the hydrocarbon vapor-adsorbent member, the covering member sealing the hydrocarbon vapor-adsorbent member to the inlet conduit, wherein hydrocarbon vapors present in the air induction system after engine shut-down are substantially retained in the hydrocarbon vapor-adsorbent member until air flows through the air induction system after the engine starts.

In another exemplary embodiment a radial seal filter is provided, the radial seal filter comprising: a ring of filtration media; a closed end; an open end configured to sealingly engage an inlet conduit of an air induction system; a hydrocarbon vapor-adsorbent member removably secured to the closed end, wherein hydrocarbon vapors present in the air induction system after engine shut-down are substantially retained in the hydrocarbon vapor-adsorbent member until air flows through the air induction system after the engine starts.

In another exemplary embodiment an air induction system for an engine is provided, the system comprising: an intake conduit; a radial seal filter removable secured to the inlet conduit, the radial seal filter comprising: a ring of filtration media; a closed end; an open end configured to sealingly engage the intake conduit; a hydrocarbon vapor-adsorbent member fixedly secured to the intake conduit, wherein the hydrocarbon vapor-adsorbent member is located within the radial seal filter and hydrocarbon vapors present in the air induction system after engine shut-down are substantially retained in the hydrocarbon vapor-adsorbent member until air flows through the air induction system after the engine starts.

In another exemplary embodiment an evaporative emissions filter or hydrocarbon absorber for an engine air induction system having an air filter housing and an air inlet flow path is disclosed. The evaporative emissions filter includes a hydrocarbon vapor-adsorbent member disposed within the air induction system.

Other exemplary embodiments further include means for mounting the evaporative emissions filter within the air induction system, wherein hydrocarbon vapors present in the air induction system after engine shut-down are substantially retained in the adsorbent member until air flows through the air induction system after the engine starts.

DETAILED DESCRIPTION OF EXEMPLARY EMBODIMENTS

Figure 1:
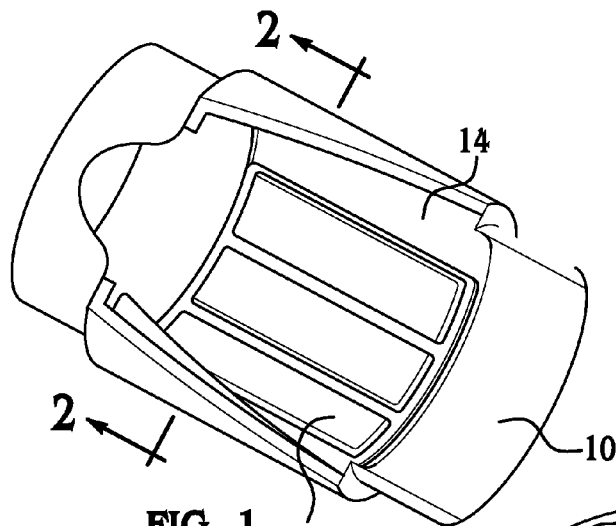
FIG. 1 is a partial cut away, perspective cross-sectional view of an air induction conduit having a hydrocarbon absorber in accordance with an exemplary embodiment of the present invention.

In accordance with one exemplary embodiment, a hydrocarbon absorber or hydrocarbon vapor-adsorbent member is located on the clean side of an air induction system having a radial seal filter. In one exemplary embodiment, the hydrocarbon absorber or hydrocarbon vapor-adsorbent member is located within the radial seal filter. By placing the hydrocarbon absorber within the radial seal filter, hydrocarbon adsorption is provided in a compact package space while not adversely affecting filter restriction. In order to properly locate the hydrocarbon absorber a support structure will locate the absorber and provide support for the absorber under airflow conditions while the engine is running.

In accordance with exemplary embodiments, the absorber will include the following constructions: spiral or layered carbon containing media wrapped or placed concentrically with an outer and/or an inner support structure, with the support structure being either metallic or molded plastic. In one embodiment, the support structure would be permanently attached to the clean side duct opening. In another embodiment, the absorber would be removably mounted to a solid end of the radial seal filter, in this embodiment; the absorber is removed during filter replacement and is thus placed into a new filter upon filter replacement. In yet another embodiment, the absorber would be permanently mounted to a solid end of the radial seal filter, in this embodiment; the absorber is removed and disposed of during filter replacement.

In another exemplary embodiment, the hydrocarbon absorber is located around the outer diameter of a conduit or duct of the air induction system, wherein the absorber is positioned to adsorb hydrocarbons within the air injection system during engine shutdown and wherein the hydrocarbon absorber is positioned to adsorb hydrocarbons without disrupting air flow upstream of a mass airflow sensor positioned in the air induction system. Of course, the hydrocarbon absorber can be located anywhere in the air intake system as long as it is in fluid communication with the hydrocarbons in the system. In this embodiment, the hydrocarbon absorber and conduit or duct can be used in air induction systems having radial seal filters, flex panel filters or any other type of air filter housing as the hydrocarbon absorber is located about the exterior of the conduit or duct of the air induction system.

In yet another exemplary embodiment, the hydrocarbon absorber is positioned above and/or around a direct airflow path through the air induction system and the absorber is positioned within a cavity of a conduit of the air induction system. In another embodiment, the carbon containing media is wrapped around the clean side duct, wherein the duct is perforated to allow hydrocarbon communication with the absorber, and an outer shell seals the hydrocarbon absorber from the environment and prevents hydrocarbon leakage to the atmosphere.

By locating the hydrocarbon absorber on the outside diameter of the clean side duct, downstream of a mass airflow sensor, disturbance of fluids flowing past the mass airflow sensor is avoided as no restriction is introduced into the system. Thus, the inclusion of a hydrocarbon absorber will not affect the flow path of the fluids through the system, which would have caused the mass airflow sensor to provide an indication that the air flow is outside a predetermined range, which is typically indicated by a "check engine" light being illuminated on the vehicle dashboard. In other words, the air inlet flow path will have the same configuration with or without the hydrocarbon absorber placed therein.

In accordance with exemplary embodiments of the present invention, the construction of the carbon containing media could be any of the following methods: non-woven or woven cloth fabric formed into a pouch or bag containing loose wood based carbon or other equivalent hydrocarbon adsorbing materials such as coal or equivalents thereof. Carbon held together with binder between two thin sheets of non-woven material, such as KX Plekx or AQF media pleated around a center or outer support structure.

Figure 2:
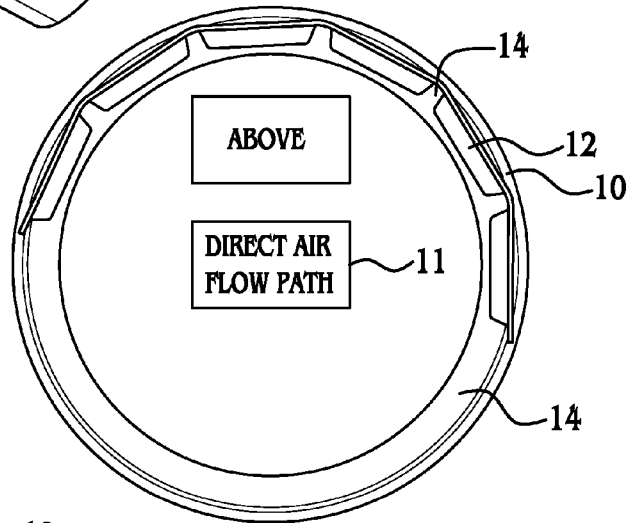
FIG. 2 is a view along lines 2-2 of FIG. 1.

Referring now to FIG. 1, a portion of a conduit or duct 10 positioned on the "clean air" side of an air filter of an air induction system is illustrated. In this embodiment, a hydrocarbon absorber 12 is positioned within a cavity or receiving area 14 of the conduit thus, the hydrocarbon absorber is positioned outside a direct air flow path of the air induction system on the "clean air" side of an air filter disposed in the air induction system. As used herein cavity or receiving area 14 is intended to refer to an area configured to receive all or a portion of the hydrocarbon absorber therein thus placing it outside a direct air flow path through the conduit. As used herein "clean air" side is intended to refer to portions of the air induction system or air filter that receives filtered air as it has already passed through a filter media of an air filter of the air induction system. In addition and in one embodiment, the hydrocarbon absorber is located on only a portion of the conduit. Alternatively, the hydrocarbon absorber can be positioned on the entire surface of the conduit. As shown in a non-limiting embodiment of FIG. 2, the hydrocarbon absorber is positioned above a direct air flow path 11 on an interior surface of the air induction system. Contrary to the methodology behind prior hydrocarbon adsorbing devices the hydrocarbon molecules of the fuel do not necessarily travel in a direct path thus, barrier types of hydrocarbon absorbers or other types of hydrocarbon absorbers relying on non-random movement of the hydrocarbon molecules do not guarantee that the desired amount of hydrocarbons will be adsorbed by the filter. Moreover, barrier types of filters or other types of filters in the direct air flow path also restrict fluid flow through the system. This random movement of the molecules is attributable to the Brownian movement of the molecules. Alternatively and as applications require the hydrocarbon absorber may be disposed on the entire surface of the conduit or portions thereof either above, below and/or besides the direct air flow path as long as the desired amount of hydrocarbon adsorption is provided while also preventing disruption of the air or fluid flow causing the mass air flow sensor to indicate air flow rates outside of a desired range.

If hydrocarbon vapors are present in the air induction system after engine shutdown, the hydrocarbon vapors will be substantially retained in the hydrocarbon adsorbent until air flows through the air induction system after the engine starts. Thereafter, the return of airflow through the air induction system substantially regenerates the hydrocarbon adsorbent by pulling away the adsorbed hydrocarbon molecules for incineration in the combustion chamber of the engine.

In accordance with an exemplary embodiment of the present invention, the hydrocarbon absorber is constructed in accordance with the teachings of U.S. patent application Ser. No. 10/978,923, filed Nov. 1, 2004; Ser. No. 10/927,383, filed Aug. 26, 2004; Ser. No. 10/806,942, filed Mar. 23, 2004; and Ser. No. 10/392,044, filed Mar. 19, 2003 the contents each of which are incorporated herein by reference thereto. Furthermore and as will discussed herein, the hydrocarbon absorber is placed outside of the direct air flow path since the inventors of exemplary embodiments of the present invention have discovered that due to Brownian movement of the hydrocarbon molecules (e.g., random movement of the molecules and collisions with each other and the housing) as well as temperature differences and the confined space of the housing, the hydrocarbons do not travel in the same direction and thus, the hydrocarbon absorber of the present invention is not required to be a barrier type device (e.g., the air must past through) or other type of device relying on non-random movement of the hydrocarbon molecules. Moreover, the hydrocarbon absorber may displaced only on a portion of the housing of the air induction system and in some non-limiting instances only above the direct air flow path since the molecules travel randomly contrary to prior beliefs that hydrocarbon molecules travel in non-random fashion and/or settle out in the bottom of the system.

Examples of the hydrocarbon vapor-adsorbing material for the hydrocarbon absorber include, but are not limited to at least one of activated carbon, wood based carbon, zeolites, cyclodextrins, hydrophobic cellulose, liquid phase absorbents (e.g. silicon oils), and/or mixtures thereof. In a non-limiting exemplary embodiment of the present disclosure, the adsorbent member 12 has as a main component comprising activated carbon. It is to be further understood that the hydrocarbon vapor-adsorbing material may be in any suitable form and housed/impregnated within any suitable media.

In one embodiment, the hydrocarbon-vapor adsorbing material may be contained by one or more fine mesh screens, it being understood that the fine mesh screen(s) may be formed from any suitable materials, including but not limited to polymeric materials, metal materials, and/or mixtures thereof. One non-limitative example of a suitable polymeric material is polyvinylidene chloride, commercially available from Dow Chemical in Midland, Mich. under the trade name SARAN.

Some non-limitative examples of carbon impregnated filtration structures are commercially available from AQF Technologies LLC in Charlotte, N.C. Other suitable non-limitative examples of adsorbent media are disclosed in U.S. Pat. No. 5,486,410, which is incorporated by reference herein in its entirety. The '410 patent discloses, among other embodiments, a filtration structure of a composite staple having a nylon sheath and a polyester core, with activated carbon particles bonded to the fiber matrix, and including a micro fiber web located within the structure. Yet other suitable adsorbent media include activated carbon commercially available from PICA USA, Inc. in Columbus, Ohio. It is further believed that wood based carbon may provide certain advantages, such as for example, in regeneration of the carbon bed. Of course, other types of carbon can also be used.

The polymeric material may be a natural material, a synthetic material, and/or a mixture of natural and synthetic materials. It is to be understood that any polymeric material that is capable of being formed as a porous material may be used. In an embodiment, the polymeric material is extruded into fibers which are woven. In an alternate embodiment, the polymeric material is a porous non-woven material. The polymeric material can be chemically similar enough to be fastened together, if such fastening is accomplished by other than a mechanical means (e.g., adhesives, ultrasonic welding and other attachment methods).

Generally, the porous polymeric materials for the layers of the hydrocarbon vapor adsorbent member are configured to have a pore size/mesh size large enough to allow the desired absorbate to pass through, yet small enough to prevent the adsorptive media from passing through. In an embodiment, the porous polymeric materials' pore size may range, for example, between about 1 µm and about 2000 µm. In a further embodiment when an adsorptive media having a relatively large average particle size is used (e.g. carbon pellets), the porous polymeric materials' pore size may range, for example, between about 200 µm and about 2000 µm. In yet a further embodiment in which an adsorptive media having a smaller average particle size is used (e.g. granular carbon), the porous polymeric materials' pore size may range, for example, between about 100 µm and about 200 µm. In still a further embodiment in which an adsorptive media having a relatively fine average particle size is used (e.g. powdered carbon), the porous polymeric materials' pore size may range, for example, between about 1 µm and about 100 µm.

It is to be understood that any suitable porous polymeric material may be used that is substantially permeable to the desired absorbate, yet substantially impermeable to the adsorptive media. Some non-limitative examples of suitable polymeric materials include, but are not limited to polyesters, polypropylenes, vinyl copolymers, polycarbonate, acetal, polyvinyl chloride, polyamides, and/or mixtures thereof. It is to be understood that the layers of the hydrocarbon vapor adsorbent member may have any suitable thickness. In one non-limiting example, the thickness of each of the layers of the hydrocarbon absorber may range between about 0.007 inch (177.8 µm) and about 0.014 inch (355.6 µm).

Figure 3A:
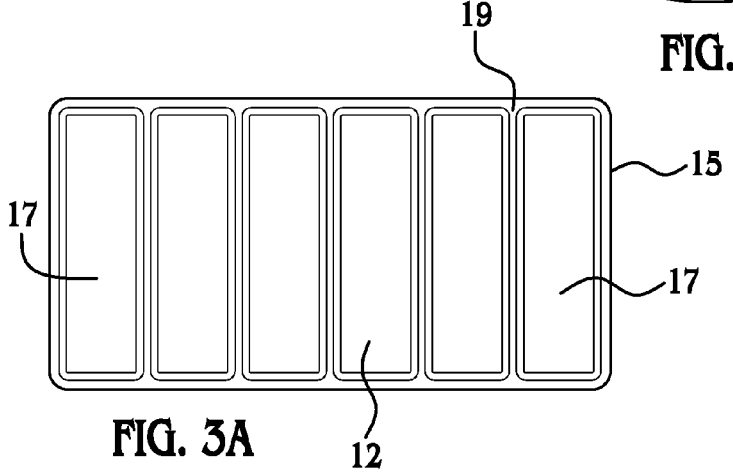
FIG. 3 are schematic views of a hydrocarbon absorber element contemplated for use in the conduit illustrated in FIGS. 1 and 2 as well as other exemplary embodiments depicted in the Figures.
Figure 3B:
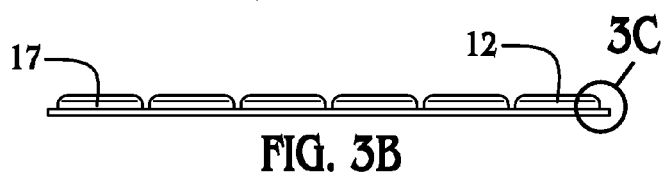
Figure 3C:
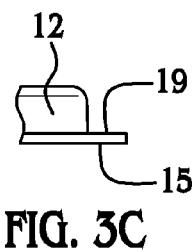

Referring now to FIGS. 3A-3C, a non-limiting exemplary embodiment of a hydrocarbon absorber or hydrocarbon adsorbing element of the present invention is illustrated. Here the hydrocarbon absorber is formed with a plurality of cells 17 each of which are spaced apart and contain an amount of hydrocarbon adsorbing material (e.g., carbon) within the cells. In accordance with an exemplary embodiment the hydrocarbon absorber is formed by a pair of permeable layers mentioned above wherein at least one of the layers is formed to have the plurality of cells therein and the other layer is a backing layer, which when sealed together by a suitable process (e.g., ultrasonic welding, adhesives, heat staking etc.) forms the hydrocarbon absorber.

Accordingly, the hydrocarbon absorber comprising the two layers, a plurality of carbon containing cells each of which spaced apart from each other comprises a flexible member that is easily conformed to the contours of the conduit of the air induction system.

Accordingly, and in accordance with an exemplary embodiment of the present invention the hydrocarbon adsorbing element is secured to the cavity of the conduit of the air induction system. In accordance with an exemplary embodiment the hydrocarbon adsorbing element is secured to the conduit via a plurality of mechanical fasteners and/or adhesives.

Figure 4:
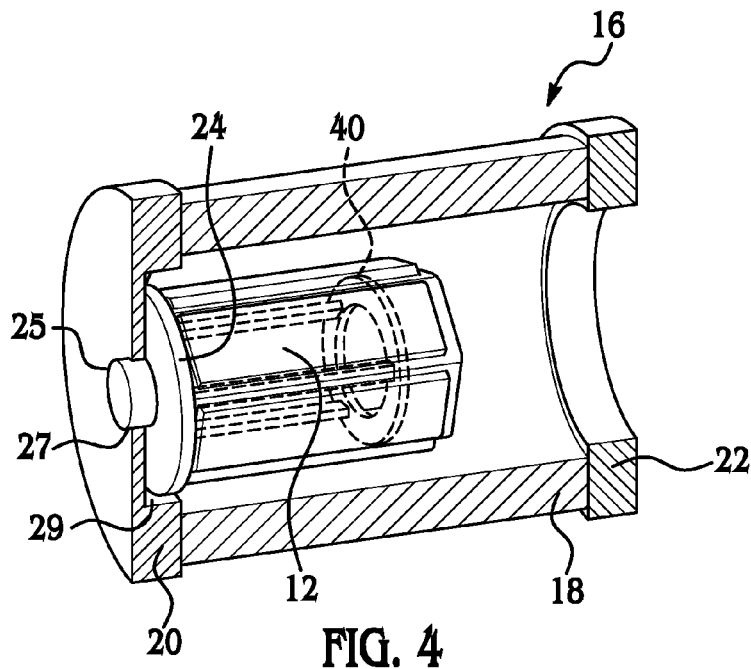
FIG. 4 is a perspective cross-sectional view of an air filter having a hydrocarbon absorber in accordance with another exemplary embodiment of the present invention.
Figure 5:
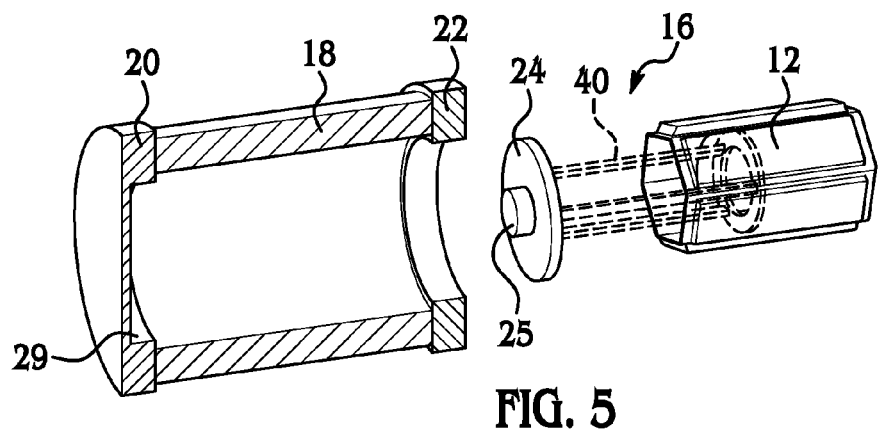
FIG. 5 is an exploded view of the air filter/hydrocarbon absorber assembly depicted in FIG. 4.

Referring now to FIGS. 4 and 5, another exemplary embodiment of the present invention is illustrated. Here, a radial seal filter 16 is configured to have a hydrocarbon absorber 12 removably secured thereto. In this embodiment, the radial seal filter comprises a ring of filter media 18 having a closed end portion 20 and an open ring portion 22 configured to secure the radial seal filter to an inlet conduit of an air induction system. In accordance with an exemplary embodiment of the present invention the ring of filter media is any type of media suitable for air filter applications one non-limiting type of media is a non-woven media commercially available from Hollingsworth & Vose as BW3, a 3 oz/yd$^2$ polyester non-woven media, BW4 (4 oz) and 7322 (high loft) media. Of course, other alternative materials are capable of providing the ring of filter media other non-limiting examples include cellulose based media or synthetic media.

As is known in the related arts end portion 20 and ring portion 22 are formed from resilient polymeric materials formed from liquid castable materials such as urethane that are potted onto the end of the media to form end portion 20 and ring portion 22 and in some instances the closed end portion may be formed from a stamped metal. Of course, media 18, closed end portion 20 and open ring portion 22 can be formed from any material known to those skilled in the related arts namely the air filtration arts in particular radial seal filters (e.g., providing a filter media between a compressible ring portion for securement onto the inlet conduit and a closed end portion). In accordance with an exemplary embodiment, the radial seal filter is positioned within a housing (not shown) wherein unfiltered air is introduced in a flow path that travels through the media of the filter element and out through the open ring portion and into the inlet conduit of the air induction system wherein the filtered air is then received into for example, an internal combustion engine.

In this embodiment, the hydrocarbon absorber is fixedly secured to a mounting member 24 configured to be removably secured to the closed end portion by for example, a spud or feature 25 configured to releasably engage an opening 27 or feature in the closed end portion. Depending on the type of material used for the closed end portion, the opening can be formed during the potting process (e.g., feature in the mold) or stamped or punched from the material. A non-limiting example of such a mounting configuration is illustrated in FIGS. 4 and 5. One non-limiting exemplary embodiment would be a plastic or metal mounting member configured to engage the closed end while engaging and supporting the hydrocarbon absorber. In accordance with an exemplary embodiment of the present invention the hydrocarbon absorber is mounted to the frame and/or mounting member by any suitable means including fasteners, screws, heat staking etc. Also, the mounting member is also capable of being secured to the closed end by a fastener, which depending on the embodiment either removable secures the mounting member to the closed end or permanently secures the mounting member to the closed end.

As illustrated, mounting member 24 is configured to be received within a cavity 29 formed in the end cap or closed end portion 20. Of course, end portion 20 may be configured to not have cavity 29. In this embodiment, feature 25 is configured to releasably engage opening 27 via a plurality of features on either or both items thus; member 24 is releasably secured to the end portion to allow for removal and replacement of the hydrocarbon adsorbing member.

In accordance with an exemplary embodiment, the mounting member 24 is configured to support the hydrocarbon adsorbing member within the inner clean side of the radial seal filter. In one non-limiting exemplary embodiment an end of the hydrocarbon absorber is fixedly secured to the mounting member thus allowing removal and replacement of the hydrocarbon adsorbing element from the air filter. As shown in FIG. 4, the hydrocarbon absorber is configured and positioned to leave an unobstructed flow path though the filter media 18 into the opening defined by the ring portion 22, which is configured to sealingly engage the inlet conduit of an air induction system.

In another alternative exemplary embodiment and as illustrated by the dashed lines in FIGS. 4 and 5, a supporting frame or structural member 40 is received within the hydrocarbon adsorbing member. In this embodiment, the frame is fixedly secured to the mounting member and the hydrocarbon absorber disposed about and supported by the frame. Alternatively, the hydrocarbon absorber is located within the frame or support structure. As shown, the hydrocarbon absorber is wrapped around the frame and an open end of the hydrocarbon absorber is provided to provide fluid communication to both the inner and outer surface areas of the hydrocarbon absorber in order to provide additional active surface area.

In this embodiment and since the mounting member is releasably secured to the end portion of the filter, the hydrocarbon absorber can be removed from the radial seal filter when the same is being exchanged for a new filter. This allows for the hydrocarbon absorber to have an extended life since the hydrocarbon absorber will typically last longer than the air filter into which the same is disposed as the hydrocarbon absorber is continuously regenerated via air flow past the hydrocarbon absorber. Accordingly and during filter replacement, the hydrocarbon absorber is removed from the dirty air filter and then the hydrocarbon absorber is secured within the new radial filter. In this embodiment, the absorber would be removably mounted to the solid end of the radial seal filter, wherein the same is capable of being removed and placed into a new filter upon filter replacement. Of course, the new filter would have a solid end cap 20 configured to releasably receive (e.g., mounting openings) the mounting member of the hydrocarbon absorber therein. In another alternative embodiment, the frame is fixedly secured to the filter and only the hydrocarbon absorber is removed and replaced. Again, the new filter would have a frame or supporting structure for the hydrocarbon absorber.

In yet another alternative embodiment, the hydrocarbon adsorbing member is permanently secured to the solid end of the radial seal filter and is thrown out with the filter as the filter is being replaced. The permanent mounting of the hydrocarbon adsorbing member to the filter may be accomplished by anyone of the aforementioned mounting means.

Figure 6:
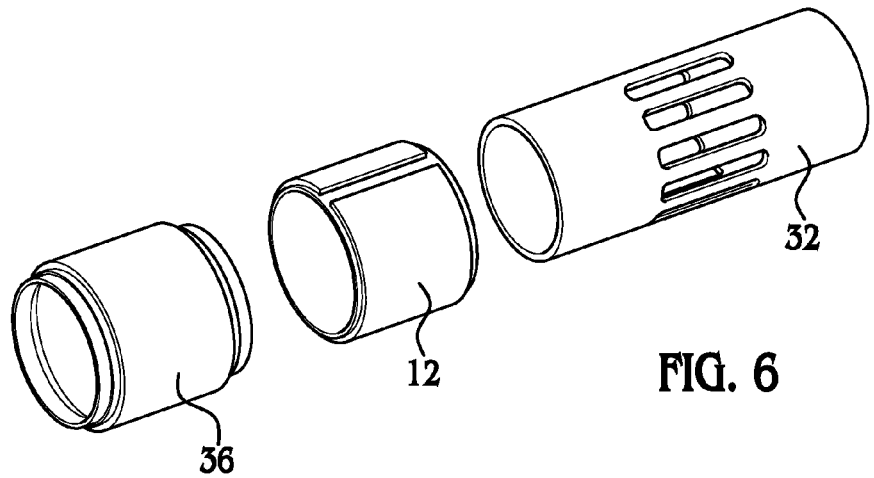
FIG. 6 is an exploded view of a hydrocarbon absorber assembly in accordance with another alternative exemplary embodiment of the present invention.
Figure 7:
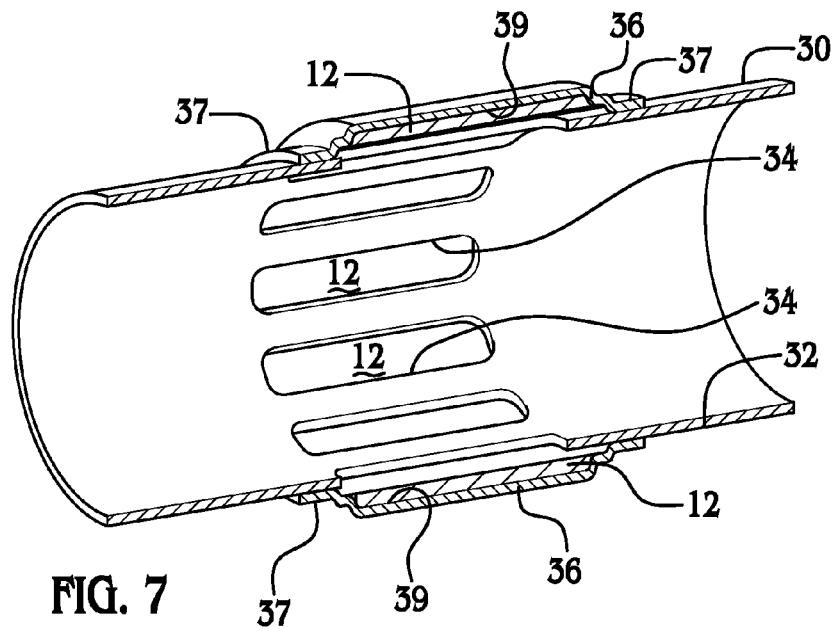
FIG. 7; is a perspective cross-sectional view of an intake conduit having a hydrocarbon absorber in accordance with the exemplary embodiment illustrated in FIG. 6.

Referring now to FIGS. 6 and 7, yet another alternative exemplary embodiment is illustrated. Here, the hydrocarbon absorber (e.g., carbon containing media of which one non-limiting example illustrated in FIGS. 3A-3C) is configured to be slid on or wrapped around the entire diameter or peripheral portion of a distinct section of an exterior surface 30 of a clean side duct or conduit 32, wherein the duct is perforated with openings 34 to allow hydrocarbon communication with the absorber, and an outer solid shell or covering member 36 seals the hydrocarbon absorber from the environment and prevents hydrocarbon leakage into the atmosphere.

In this embodiment, the conduit is configured to have one end in fluid communication with the clean side of the air filter and the other end is in fluid communication with the internal combustion engine receiving air flow from the air induction system. The hydrocarbon absorber and shell 36 are configured to wrap around all of a portion of a diameter or peripheral portion of a distinct section of the conduit and the shell seals the hydrocarbon absorber about the exterior of the conduit. In accordance with an exemplary embodiment of the present invention the hydrocarbon absorber and the shell portion and/or the materials comprising the shell and the hydrocarbon absorber are flexible (e.g., flexible plastics, polymers, nylons or equivalents thereof) in order to be wrapped around the exterior of the inlet conduit or alternatively and if the hydrocarbon absorber and the shell portion are more rigid they are configured to wrap around the exterior of the inlet conduit and the shell is configured to sealingly enclose the hydrocarbon absorber to the inlet conduit.

In accordance with an exemplary embodiment the hydrocarbon absorber is either wrapped around the exterior of the clean side conduit or slid over the exterior surface of the conduit. In addition and in accordance with an exemplary embodiment the shell is also slid on or wrapped around the conduit and then the shell is secured to the conduit via adhesives or any other suitable mechanical mounting means (e.g., ultrasonic welding, heat staking or equivalents thereof). For example, the shell or sealing member is in one non-limiting exemplary embodiment ultrasonically welded to the conduit. In this embodiment, the conduit and the shell or sealing member is formed from a polymeric material such as plastic suitable for ultrasonic welding or heat staking. If the hydrocarbon absorber and the covering member or shell is slid or wrapped onto the conduit the same are obviously configured to have enough clearance to be positioned about the conduit and in the case of the shell the conduit and the hydrocarbon absorber alternatively and/or in addition to configuring the hydrocarbon absorber and the shell to slid over the conduit the shell and the hydrocarbon absorber may each be cut or split in the ring shaped member of the hydrocarbon absorber and the shell to allow expansion of the ring of the shell and the hydrocarbon absorber so as to allow the same to be disposed over the exterior of the conduit. Thereafter and once in the desired location, the shell and hydrocarbon absorber are then pushed back together along the split line or snap back together due to the resilient characteristics of the hydrocarbon absorber and the shell and the same are then secured to the conduit. The expansion and contraction of the shell and the hydrocarbon absorber would be possible due to the flexible materials (e.g., nylon, plastic, polymers, synthetics and equivalents thereof) contemplated for the same.

In one non-limiting example and as illustrated in FIG. 7, the shell has a pair of flange portions 37 or at least one flange portion for securement to the conduit and the shell defines a cavity 39 to receive the hydrocarbon absorber therein thus, the cavity receives the hydrocarbon absorber therein and the flanges are secured to the conduit on the exterior surface outside of the peripheral openings of openings 34. In another alternative exemplary embodiment, the conduit may be configured to have features to receive the flange portions therein.

As illustrated, a portion of the duct or conduit 32 is shown and the hydrocarbon absorber is wrapped around the exterior of the duct and fluid communication between the hydrocarbon absorber and the interior of the duct is provided through openings 34. Thereafter, the shell or sealing member 36 is secured to the conduit and the hydrocarbon absorber is retained therein, wherein the sealing of the shell to the exterior of the conduit prevents adsorbed hydrocarbons of the hydrocarbon absorber from exiting the conduit. Thus, the hydrocarbon absorber is located around the outer diameter of the conduit or duct of the air induction system, wherein the absorber is positioned to adsorb hydrocarbons within the air injection system through openings 34 during engine shutdown and wherein the hydrocarbon absorber is positioned to adsorb hydrocarbons without disrupting air flow upstream of a mass airflow sensor positioned in the air induction system. In accordance with an exemplary embodiment of the present invention the size of the hydrocarbon absorber, the size and number of openings 34 is determined by the amount of required hydrocarbon absorber surface area for the desired performance (e.g., adsorption of hydrocarbon molecules during engine shut down). For example, in one exemplary embodiment the openings 34 are disposed about an entire peripheral portion of the inlet conduit and the covering member or shell is configured to cover all the openings and the hydrocarbon absorber is configured all or some of the openings to provide the desired amount of adsorption through openings 34. Alternatively, only a portion of the periphery of the conduit has openings 34 and the hydrocarbon absorber and the shell or covering member are configured to cover the same. Again and in this embodiment, the hydrocarbon absorber and shell or covering member can be configured to cover all of an entire periphery of the conduit or only a portion of the conduit, which may be above, besides, below or completely around the direct air flow path.

In this embodiment, the hydrocarbon absorber and conduit or duct can be used in air induction systems having radial seal filters, flex panel filters or any other type of air filter housing as the hydrocarbon absorber is located about the exterior of the conduit or duct of the air induction system and will not interfere with the air or fluid flow through the conduit. In one non-limiting exemplary embodiment the hydrocarbon absorber is located on a conduit that is in fluid communication with the clean side of the air filter. Of course and if applications and performance criteria permit the hydrocarbon absorber is mounted to an inlet conduit of the air induction system (e.g., the conduit that feeds air into the air filter of the system).

Figure 8:
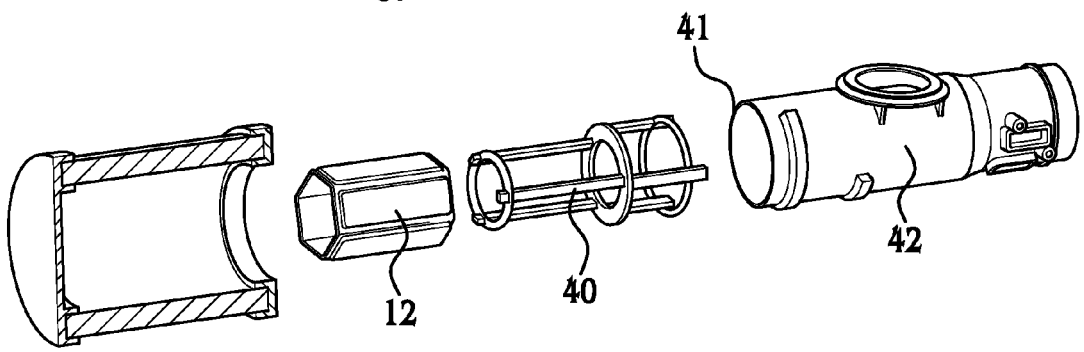
FIG. 8 is an exploded view of an air filter/hydrocarbon absorber assembly in accordance with another exemplary embodiment of the present invention.
Figure 9:
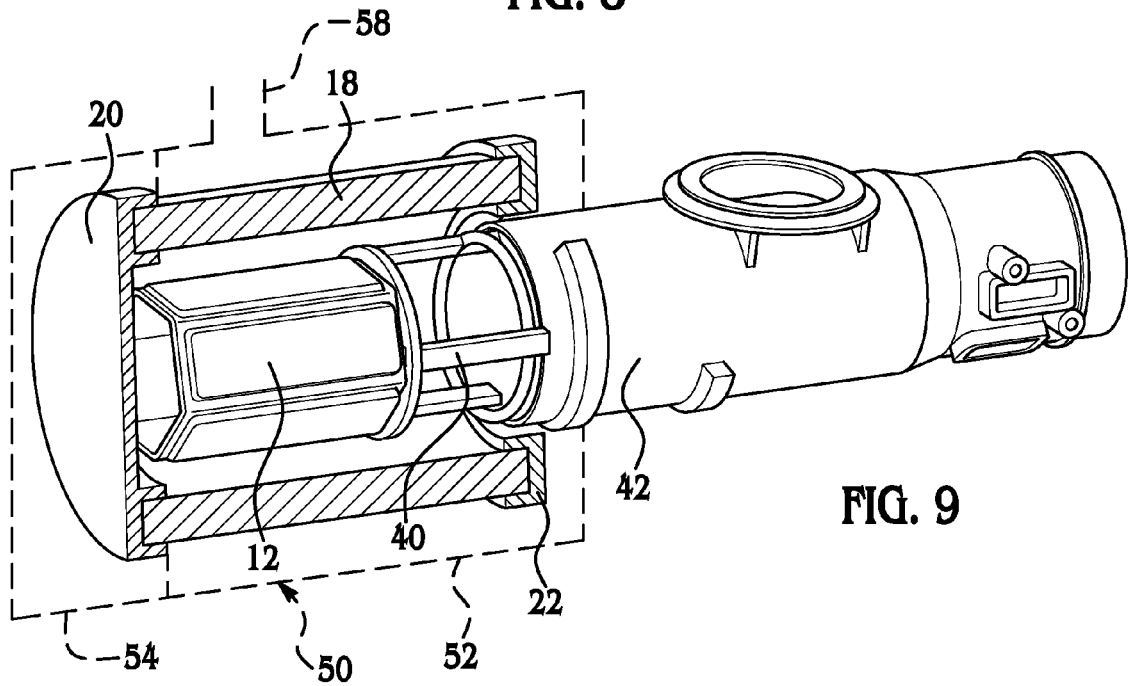
FIG. 9; is a perspective cross-sectional view of an air filter having a hydrocarbon absorber in accordance with the exemplary embodiment illustrated in FIG. 8.

Referring now to FIGS. 8 and 9, yet another alternative exemplary embodiment is illustrated. Here, the hydrocarbon absorber (e.g., carbon containing media) is mounted to a structure or supporting frame 40, which is fixedly secured to an inlet end 41 of an inlet duct 42 of an air induction system. In this embodiment, the hydrocarbon absorber is fixedly secured to the inlet duct so that the absorber remains secured thereto when the radial seal filter is removed and replaced. In other words, the radial seal filter is disposed about the hydrocarbon absorber when it is secured to the conduit and a housing with an air inlet is disposed about the radial seal filter.

In accordance with an exemplary embodiment of the present invention and as illustrated by the dashed lines in FIG. 9 a two piece housing 50 comprising a first portion 52 and a second portion 54 with an inlet 56 is configured to be secured about the radial seal filter in addition to being secured to the inlet conduit 42. In this embodiment, the second portion is configured to be removably secured to the first portion, which is secured to the inlet conduit 42. Accordingly, the housing is configured for removal and replacement of the air filter during use. Of course, this is but one non-limiting example and the housing may have any other suitable configuration.

As in the previous embodiment, the radial seal filter is configured to have a ring of filter media having a closed end portion and an open ring portion configured to secure the radial seal filter to the inlet conduit of an air induction system and the hydrocarbon absorber comprises spiral or layered carbon containing media, wrapped or placed concentrically with an outer and/or inner support structure or stand off 40. In one exemplary embodiment, the structure 40 and hydrocarbon absorber 12 is configured such that the hydrocarbon absorber is spaced away from the opening of the conduit so that un-impeded flow of filtered fluid may pass through media 18 into the opening of conduit 42. As illustrated, structure 40 has a plurality of ring members of various diameters secured to each other by a plurality of structural members, which provide a support and/or mounting surface for the hydrocarbon absorber and in this embodiment position the hydrocarbon absorber away from the inlet end of the conduit.

In addition, the hydrocarbon absorber is wrapped around the frame or support structure and an open end of the hydrocarbon absorber is provided at either end to provide fluid communication to both the inner and outer surface areas of the hydrocarbon absorber in order to provide additional active surface area. Alternatively, the hydrocarbon absorber is located within the frame or support structure. Moreover, fluid flow is capable of passing through the hydrocarbon absorber as it configured into a cylindrical or tube shape with open ends. Also, fluid flow is capable of passing around the exterior of the hydrocarbon absorber or may flow directly from the media into the inlet conduit due to the spaced relationship of the hydrocarbon absorber to the open end of the inlet conduit. Of course, it is contemplated that exemplary embodiments are directed to filters and conduits wherein the hydrocarbon absorber and the complimentary support structure may have numerous configurations other than those specifically shown in the attached drawings.

In addition, and in accordance with an exemplary embodiment, the support structure is either metallic, molded plastic or any other suitable type of material, and in this embodiment the structure is permanently attached to the clean side duct opening of the inlet conduit 42 via welding, fasteners and/or adhesives. In addition and in one embodiment, the hydrocarbon absorber is welded or heat staked to a nylon support structure or stand off of the structure 40. In this embodiment, the hydrocarbon absorber can be secured to the frame before or after the frame is secured to the inlet conduit or vice versa.

Construction of the carbon containing media could be any of the following methods: Non woven or woven cloth fabric formed into a pouch or bag containing loose wood based carbon or other equivalent hydrocarbon adsorbing media; carbon held together with binder between two thin sheets of non-woven material, such as KX Plekx or PLEKX available from KX industries or AQF media; and KX Plekx or AQF media pleated around a center or outer support structure.

Without being bound to any theory, it is believed that exemplary embodiments of the present invention advantageously increase the probability of interaction with and subsequent capture of the desired absorbate. Further, by placing the hydrocarbon absorber within the radial seal filter, hydrocarbon adsorption is attained in a compact package space while not adversely affecting filter filtration. In addition, and by placing the hydrocarbon absorber within the radial seal filter, the support structure locates the absorber and provides support for the absorber under airflow conditions while the engine is running. Moreover, and by locating the absorber around the outside diameter of the clean side duct, downstream of a mass airflow sensor, disturbance to the mass airflow sensor is avoided, and no restriction is introduced to the system.

In one non-limiting example, the embodiment of FIGS. 8 and 9 (e.g., internal to the clean side of the air filter with a nylon stand-off) was tested with the following results: performance, restriction=0.6"H2O rise over baseline, breakthrough=95%, restriction was run without the stand-off cage in place. There will be little change in restriction with cage in place.

Figure 10:
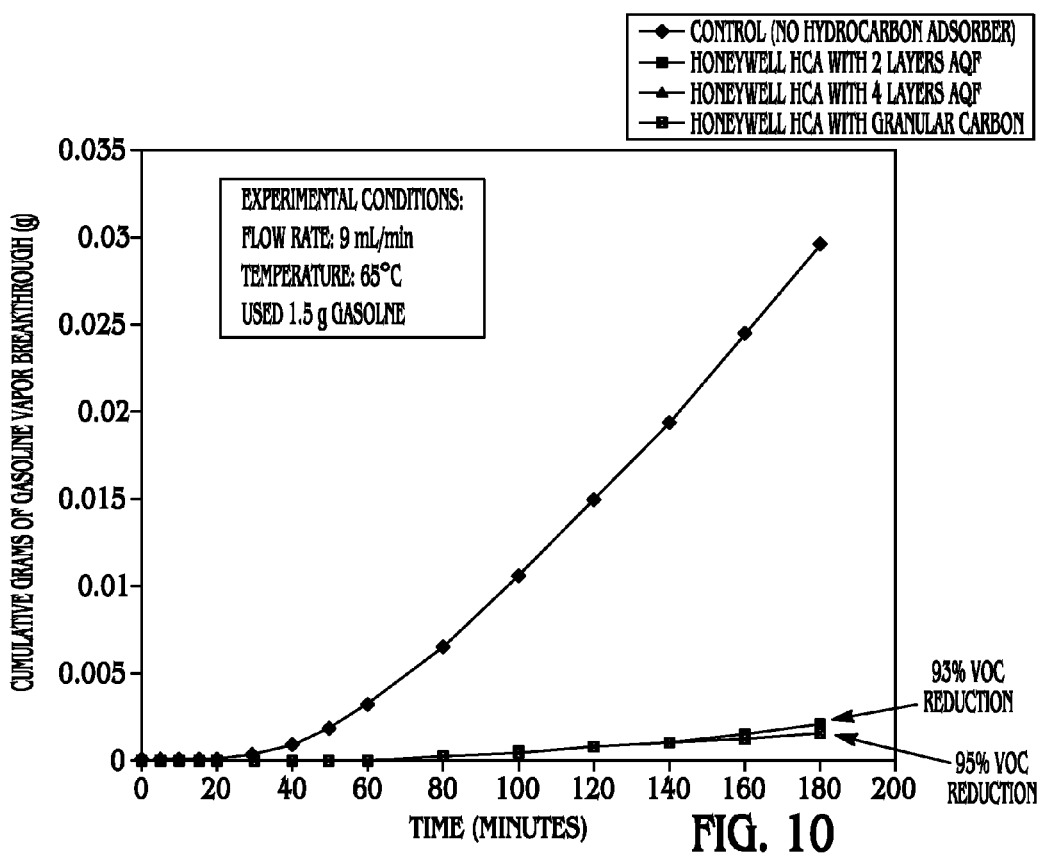
FIGS. 10 and 11 are graphs illustrating cumulative grams of gasoline vapor breakthrough vs. time with regard to various exemplary embodiments as well as controls.
Figure 11:
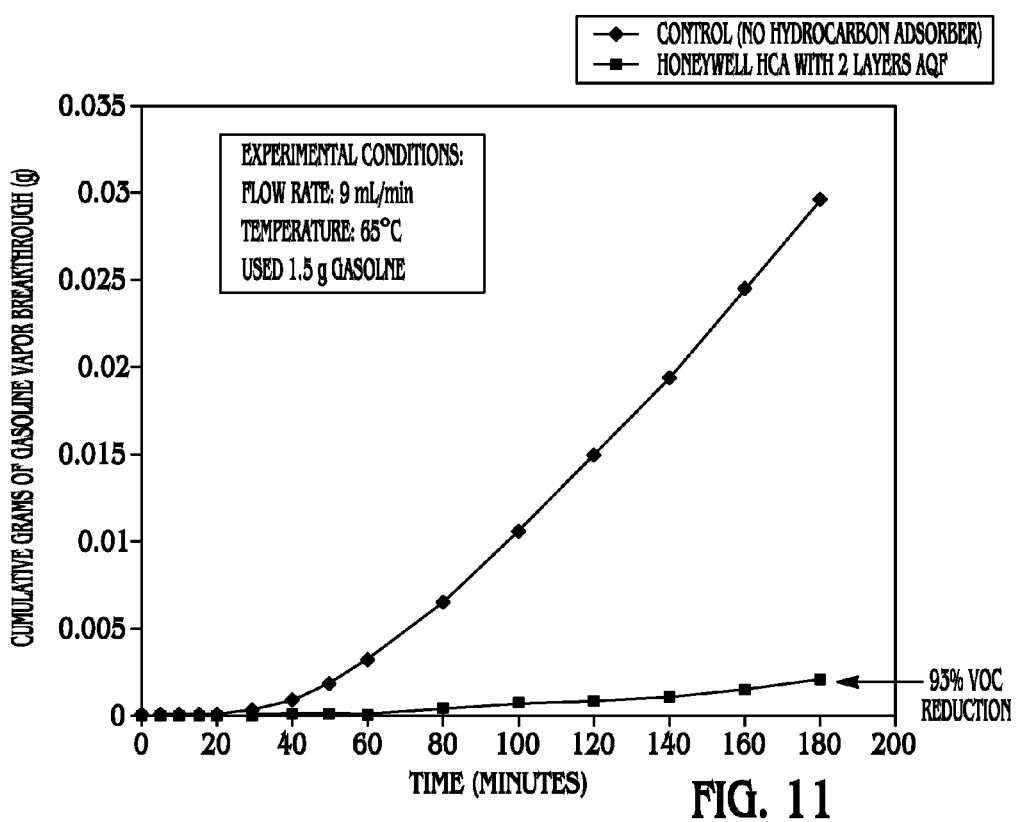

In another non-limiting example, the embodiment of FIGS. 4 and 5 (e.g., absorber internal to the clean side of the air filter and attached to the closed end of the radial seal air filter) was tested with the following results: performance, restriction=0.6" H2O rise over baseline, breakthrough=95%. FIGS. 10 and 11 illustrate additional testing results of exemplary embodiments of the present invention.

In accordance with an exemplary embodiment of the present invention, a method of adsorbing hydrocarbon vapors from an automotive engine air induction system after engine shut-down is disclosed. The method comprises the step of operatively placing the evaporative emissions filter within the radial seal filter or outside the inlet duct past the mass air flow sensor (the hydrocarbon absorber may be placed before the Mass Air Flow Sensor in some cases) wherein hydrocarbon vapors present in the air induction system after engine shutdown are substantially retained in the adsorbent member until air flows through the air induction system after the engine starts. Thereafter, the adsorbed hydrocarbons are released back into the air induction system wherein they will be drawn into the engine via the air induction system.

Due to Brownian movement of the hydrocarbon molecules (e.g., random movement of the molecules and collisions with each other of the housing) as well as temperature differences and the confined space of the housing, the hydrocarbons do not travel in the same direction and thus, the hydrocarbon absorber of the present invention is not required to be a barrier type device (e.g., the air must past through).

Accordingly and in accordance with exemplary embodiments of the present invention, the absorber is positioned to adsorb hydrocarbons within the air induction system during engine shutdown and wherein the hydrocarbon absorber is positioned to adsorb hydrocarbons without disrupting air flow upstream of a mass airflow sensor positioned in the air induction system. In this embodiment, the hydrocarbon absorber and conduit or duct can be used in air induction systems having radial seal filters, flex panel filters or any other type of air filter housing as the hydrocarbon absorber is located about the exterior of the conduit or duct of the air induction system. In one non-limiting exemplary embodiment the hydrocarbon absorber is located on the clean side of the air filter. In one non-limiting exemplary embodiment the hydrocarbon absorber is located on a conduit that is in fluid communication with the clean side of the air filter. Of course and if applications and performance criteria permit the hydrocarbon absorber is mounted to an inlet conduit of the air induction system (e.g., the conduit that feeds air into the air filter of the system).

In other alternative exemplary embodiments it is contemplated that various embodiments may be combined to provide further hydrocarbon adsorption for example the conduit depicted in FIGS. 1, 2, 6 and 7 may be combined with the radial seal filter of FIGS. 4, 5 and/or the conduit/filter assembly depicted in FIGS. 8 and 9 thus, multiple hydrocarbon absorbers may be positioned in or around the conduit and the air filter. Of course, exemplary embodiments also contemplate specific and/or independent applications of the various embodiments described herein.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An inlet conduit for an engine air induction system, comprising:
   a plurality of openings located about the inlet conduit;
   a hydrocarbon vapor-adsorbent member disposed on an exterior surface of the inlet conduit, the hydrocarbon vapor-adsorbent member covering the plurality of openings; and
   a covering member secured over the hydrocarbon vapor-adsorbent member, the covering member sealing the hydrocarbon vapor-adsorbent member to the inlet conduit, wherein hydrocarbon vapors present in the air induction system after engine shut-down are substantially retained in the hydrocarbon vapor-adsorbent member until air flows through the air induction system after the engine starts and wherein the covering member and the hydrocarbon vapor-adsorbent member have flexible qualities allowing the covering member and the hydrocarbon vapor-adsorbent member to be wrapped around the exterior surface of the conduit prior to the securement of the covering member to the inlet conduit.

2. An inlet conduit for an engine air induction system, comprising:
   a plurality of openings located about the inlet conduit;
   a hydrocarbon vapor-adsorbent member disposed on an exterior surface of the inlet conduit, the hydrocarbon vapor-adsorbent member covering the plurality of openings; and
   a covering member secured over the hydrocarbon vapor-adsorbent member, the covering member sealing the hydrocarbon vapor-adsorbent member to the inlet conduit, wherein hydrocarbon vapors present in the air induction system after engine shut-down are substantially retained in the hydrocarbon vapor-adsorbent member until air flows through the air induction system after the engine starts, wherein the hydrocarbon vapor-adsorbent member comprises carbon containing media and wherein the carbon containing media further comprises a wood based carbon held within a pouch defined by woven or non-woven cloth fabric and the plurality of openings are disposed about an entire peripheral portion of the inlet conduit and the hydrocarbon vapor-adsorbent member and the covering member are disposed about an entire peripheral portion of the conduit.

3. The inlet conduit as in claim 2, wherein covering member is configured to have a pair of flange portions for securement to the exterior surface of the inlet conduit and the covering member defines a cavity for receiving the hydrocarbon vapor adsorbent member therein.

4. The inlet conduit as in claim 1, wherein the plurality of openings are disposed about an entire peripheral portion of the inlet conduit.

5. The inlet conduit as in claim 1, wherein the covering member and the hydrocarbon vapor-adsorbent member are slid onto the inlet conduit prior to the securement of the covering member to the inlet conduit.

6. The inlet conduit as in claim 1, wherein the covering member is secured to the inlet conduit by any one of the following processes: heat staking, ultrasonic welding, adhesives and combinations thereof and the plurality of openings are disposed about only a portion of a periphery of the inlet conduit and the hydrocarbon vapor-adsorbent member and the covering member do not completely surround the inlet conduit.

7. The inlet conduit as in claim 1, wherein the inlet conduit is configured for use in an air induction system comprising a radial seal filter and the inlet conduit is positioned to receive filtered fluids from the radial seal filter.

8. The inlet conduit as in claim 1, wherein the inlet conduit is configured for use in an air induction system comprising a radial seal filter and the radial seal filter comprises a ring of filtration media; a closed end; an open end configured to sealingly engage an inlet conduit of an air induction system; a hydrocarbon vapor-adsorbent member removably secured to the closed end, and hydrocarbon vapors present in the air induction system after engine shut-down are substantially retained in the hydrocarbon vapor-adsorbent member until air flows through the air induction system after the engine starts.

9. The inlet conduit as in claim 8, wherein the hydrocarbon vapor-adsorbent member of the radial seal filter is mounted to a mounting member having a feature configured to releasably engage an opening in the closed end.

10. A radial seal filter, comprising:
    a ring of filtration media;
    a closed end;
    an open end configured to sealingly engage an inlet conduit of an air induction system; and
    a hydrocarbon vapor-adsorbent member removably secured to the closed end, and hydrocarbon vapors present in the air induction system after engine shut-down are substantially retained in the hydrocarbon vapor-adsorbent member until air flows through the air induction system after the engine starts, wherein the hydrocarbon vapor-adsorbent member comprises carbon containing media and the carbon containing media is held within a pouch comprising woven or non-woven cloth fabric.

11. The radial seal filter as in claim 10, wherein the hydrocarbon vapor-adsorbent member is mounted to a mounting member having a feature configured to releasably engage an opening in the closed end.

12. The radial seal filter as in claim 11, wherein the hydrocarbon vapor-adsorbent member is mounted to a frame secured to the mounting member.

13. The radial seal filter as in claim 11, wherein the mounting member is received within a cavity formed in the closed end.

14. An air induction system for an engine, the system comprising:
    an intake conduit;
    a radial seal filter removable secured to the inlet conduit, the radial seal filter comprising: a ring of filtration media; a closed end; and an open end configured to sealingly engage the intake conduit; and
    a hydrocarbon vapor-adsorbent member fixedly secured to the intake conduit, and the hydrocarbon vapor-adsorbent member is located within the radial seal filter when the radial seal filter is secured to the inlet conduit and hydrocarbon vapors present in the air induction system after engine shut-down are substantially retained in the hydrocarbon vapor-adsorbent member until air flows through the air induction system after the engine starts, wherein the hydrocarbon vapor-adsorbent member comprises carbon containing media and the carbon containing media is held within a pouch comprising. woven or non-woven cloth fabric.

15. The air induction system as in claim 14, wherein the hydrocarbon vapor-adsorbent member is secured to a frame secured to the inlet conduit.

16. A radial seal filter, comprising:
a ring of filtration media having a first end and a second end, the ring of filtration media defining a central cavity;
a closed end secured to the second end such that fluid flow into or out of the central cavity occurs only at the first end or through an opening into the central cavity bounded by the first end or through the ring of filtration media; and
a hydrocarbon vapor-adsorbent member secured to the closed end such that the hydrocarbon vapor-adsorbent member is disposed in the central cavity and spaced from an inner surface of the ring of filtration media.

17. The radial seal filter as in claim 16, wherein the hydrocarbon vapor-adsorbent member is removably secured to the closed end.

18. The radial seal filter as in claim 16, wherein the opening into the central cavity is configured to sealingly engage an inlet conduit of an air induction system and hydrocarbon vapors present in the air induction system after engine shutdown are substantially retained in the hydrocarbon vapor-adsorbent member until air flows through the air induction system after the engine starts.

19. The radial seal filter as in claim 16, wherein the hydrocarbon vapor-adsorbent member is mounted to a frame secured to a mounting member configured to engage the closed end.

20. The radial seal filter as in claim 19, wherein the mounting member configured to removably engage the closed end.

* * * * *